United States Patent
Bachrach et al.

(10) Patent No.: US 8,098,543 B2
(45) Date of Patent: Jan. 17, 2012

(54) ESTIMATION OF STRESS AND ELASTIC PARAMETERS

(75) Inventors: Ran Bachrach, Houston, TX (US); Madhumita Sengupta, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 1048 days.

(21) Appl. No.: 11/969,162

(22) Filed: Jan. 3, 2008

(65) Prior Publication Data

US 2008/0165619 A1 Jul. 10, 2008

Related U.S. Application Data

(60) Provisional application No. 60/883,646, filed on Jan. 5, 2007.

(51) Int. Cl.
*G01V 1/00* (2006.01)

(52) U.S. Cl. .......................................................... 367/73

(58) Field of Classification Search .................... 367/38, 367/73
See application file for complete search history.

(56) References Cited

U.S. PATENT DOCUMENTS

| | | | |
|---|---|---|---|
| 5,691,475 A * | 11/1997 | Marsala et al. ................. | 73/597 |
| 6,502,037 B1 * | 12/2002 | Jorgensen et al. ............. | 702/14 |
| 6,714,873 B2 * | 3/2004 | Bakulin et al. ................. | 702/14 |
| 7,277,795 B2 * | 10/2007 | Boitnott ............................ | 702/6 |
| 7,299,132 B2 * | 11/2007 | Sayers et al. ..................... | 702/9 |
| 7,355,923 B2 * | 4/2008 | Reshef et al. ................... | 367/53 |
| 7,526,385 B2 * | 4/2009 | Sayers ............................. | 702/13 |
| 7,755,972 B2 * | 7/2010 | Yogeswaren et al. ........... | 367/31 |
| 7,830,747 B2 * | 11/2010 | Sollner ............................ | 367/51 |
| 7,859,943 B2 * | 12/2010 | Herwanger ..................... | 367/38 |
| 2005/0171698 A1 * | 8/2005 | Sung et al. ....................... | 702/9 |
| 2006/0153005 A1 * | 7/2006 | Herwanger et al. ............. | 367/38 |
| 2010/0018718 A1 * | 1/2010 | Krebs et al. ................... | 166/369 |

FOREIGN PATENT DOCUMENTS

GB 2422031 A1 7/2006

OTHER PUBLICATIONS

International Search Report, dated Jun. 4, 2008, for Application No. PCT/US2008/050225.

* cited by examiner

*Primary Examiner* — Jack Keith
*Assistant Examiner* — Krystine Breier (57) ABSTRACT

Various implementations described herein are directed to estimating stresses and elastic parameters in a formation based on seismic data. In one implementation, wide azimuth seismic data may be used to derive anisotropic elastic parameters. Furthermore, stresses may be calculated using a geomechanical earth model, followed by deriving anisotropic elastic parameters based on the calculated stresses. The anisotropic elastic parameters derived from the wide azimuth seismic data may then be used to modify the geomechanical earth model to improve the prediction of drilling parameters.

30 Claims, 3 Drawing Sheets

ESTIMATION OF STRESS AND ELASTIC PARAMETERS

CROSS-REFERENCE TO RELATED APPLICATIONS

This application claims benefit of U.S. provisional patent application Ser. No. 60/883,646, filed Jan. 5, 2007, which is incorporated herein by reference.

BACKGROUND

1. Field of the Invention

Implementations of various technologies described herein generally relate to the field of geology and geophysics and more particularly, to the estimation of formation characteristics, such as effective stresses and pore pressure from seismic data.

2. Description of the Related Art

The following descriptions and examples do not constitute an admission as prior art by virtue of their inclusion within this section.

Many subsurface-related human activities, such as oil and gas exploration and production, mining, underground construction, and earthquake prediction, can benefit from direct estimates of the state of stress of the earth subsurface. The importance of stress estimates increases when principal stresses are not equal to each other and when some preferred directions, e.g., directions of maximum and minimum stresses, exist in geological media.

Examples of applications requiring good knowledge of existing stressed state or pore fluid pressure include planning of drilling operation and mine construction. In those situations, poor estimates of effective stresses may lead to additional costs and safety problems related to geological hazards and instability of borehole or mine. Furthermore, the development of many existing oil fields and orientation of fractures are typically controlled by direction of maximum horizontal stress. Therefore, stress characterization performed prior to production may reduce risk in reservoir management decisions, particularly for production in areas having salt bodies.

SUMMARY

Various techniques described herein are generally directed to a method for processing seismic data. In one implementation, the method may include deriving anisotropic parameters and elastic stiffness using seismic data, calculating stresses using a geomechanical earth model and using the anisotropic parameters and the elastic stiffness to modify the geomechanical earth model.

In another implementation, the method may include deriving anisotropic parameters and elastic stiffness using wide azimuth seismic data, calculating stresses using a geomechanical earth model, using the anisotropic parameters and the elastic stiffness to modify the geomechanical earth model and predicting drilling parameters using the modified geomechanical earth model.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issue patent herein.

Figure 1:
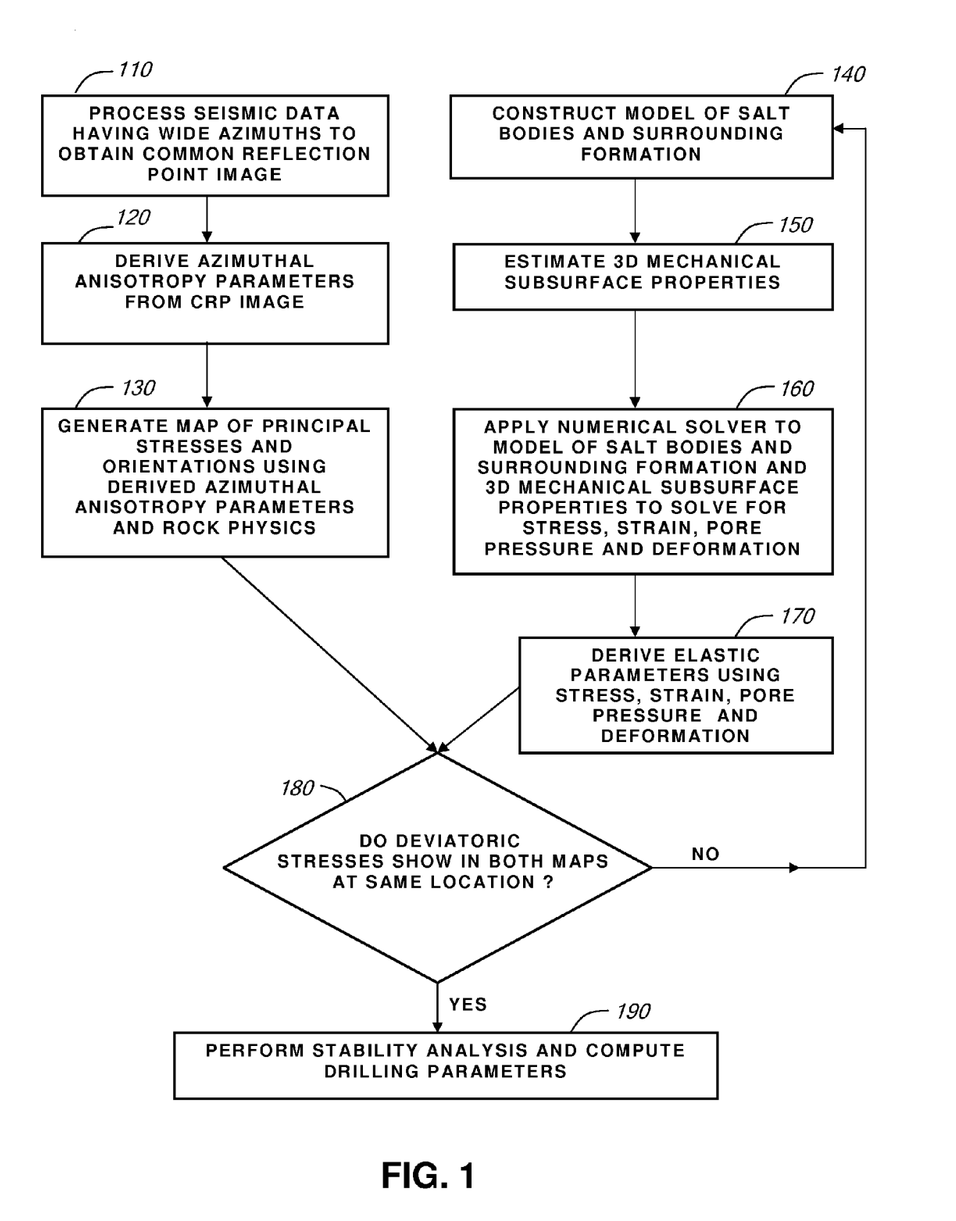
FIG. 1 is a flowchart illustrating a method of determining stresses and elastic parameters in a formation in accordance with implementations described herein.

FIG. 1 illustrates a method 100 for determining stresses and elastic parameters in a formation in accordance with implementations of various implementations described herein. Steps 110-130 are directed to deriving anisotropic elastic parameters, e.g., elastic stiffness and the like, using wide azimuth seismic data followed by generating a three dimensional map of estimated principal stresses and orientations using the derived anisotropic elastic parameters. Steps 140-170 are directed to calculating stresses using a geomechanical earth model, followed by deriving anisotropic elastic parameters based on the calculated stresses. The anisotropic elastic parameters derived from the wide azimuth seismic data may then be used to modify the geomechanical earth model to improve drilling parameters prediction.

In one implementation, the seismic data to be processed and used in connection with method 100 may be acquired using a wide azimuth or full azimuth towed streamer seismic acquisition system. Such a system may involve acquiring marine seismic data through a range of (or all) angles that a direct line from a source to a receiver makes with true north. One such method is described in commonly assigned U.S. patent application Ser. No. 11/335,365, entitled METHODS AND SYSTEMS FOR EFFICIENTLY ACQUIRING WIDE AZIMUTH AND/OR FULL AZIMUTH TOWED STREAMER SEISMIC SURVEYS, filed Jan. 19, 2006, which is described in more detail below in the section titled "Efficiently Acquiring Wide Azimuth and/or Full Azimuth Towed Streamer Seismic Surveys."

As will be shown herein, the wide azimuth seismic data may be used to map stresses associated with the presence of salt bodies. It should be understood, however, that the seismic data may be acquired using other types of marine acquisition systems, as well as land acquisition systems.

At step 110, the seismic data may be processed to obtain a common reflection point (CRP) image. The seismic data may be processed using various techniques, such as migration, noise removal and the like, that are typically used to generate an image.

At step 120, azimuthal anisotropy parameters may be derived from the CRP image. Examples of azimuthal anisotropy parameters include stiffness tensor, Thomson parameters, reflectivity, velocity from travel time analysis, reflection strength and the like. In one implementation, the azimuthal anisotropy parameters may be derived using tomography on the various azimuths associated with the CRP image. In this implementation, the background velocity model may be kept constant while the CRP tomography velocity updates may be calculated for each azimuth. The background velocity model may be obtained using a moveout analysis of single azimuth data or stacked data, while the addition of each azimuth may provide an update to the background. In another implementation, the azimuthal anisotropy parameters may be derived using a moveout analysis on the various azimuths associated with the CRP image. In yet another implementation, the azimuthal anisotropy parameters may be derived using amplitude vs. angle and azimuth (AVAZ) inversion. In still another implementation, the azimuthal anisotropy parameters may be derived using various techniques described in commonly assigned U.S. Pat. No. 6,714,873, entitled SYSTEM AND METHOD FOR ESTIMATING SUBSURFACE PRINCIPAL STRESSES FROM SEISMIC REFLECTION DATA, which is described below in more detail in the section titled "Estimating Subsurface Principal Stresses from Seismic Reflection Data. For example, a three dimensional map of elastic stiffness tensor associated with the azimuthal anisotropy parameters may be generated using one or more techniques described in the commonly assigned U.S. Pat. No. 6,714,873.

In still yet another implementation, the azimuthal anisotropy parameters may be derived using a combination of the various techniques mentioned above. In this manner, a three dimensional map of azimuthal anisotropy parameters and directions may be generated.

At step 130, the derived azimuthal anisotropy parameters may be used to generate a three dimensional map of estimated principal stresses and orientations using rock physics theoretical transformations. In one implementation, the three dimensional map of estimated principal stresses and orientations may be generated using techniques, such as third order elasticity theory and the like, described in commonly assigned U.S. Pat. No. 6,714,873, entitled SYSTEM AND METHOD FOR ESTIMATING SUBSURFACE PRINCIPAL STRESSES FROM SEISMIC REFLECTION DATA, which is described below in more detail in the section entitled "Estimating Subsurface Principal Stresses from Seismic Reflection Data.".

At step 140, a geomechanical model of salt bodies and surrounding formation may be constructed using initial seismic data, such as velocities, horizons compaction trends and the like. This initial seismic data may be the same data used in step 110. The geomechanical model may also be referred to as geomechanical earth model, which may be defined as a combination of 3D seismic image and a set of physical properties assigned to each pixel in the 3D seismic image. In one implementation, the geomechanical model may be constructed using vintage seismic images to map salt bodies and migration velocity analysis constrained by well log data. Vintage seismic images refer to any seismic image of the same area, shot with a relatively older technology. For example, vintage seismic images may include single azimuth seismic images (as opposed to new wide-azimuth data), or conventional seismic images (as opposed to Q data). Vintage seismic images may also refer to old 2D lines, as opposed to new 3D data. The well log data may be interpolated in 3D using seismic horizons, which may be defined as visible layers in the 3D seismic image. In one implementation, the seismic velocities from the initial seismic data and the well log data may be transformed to a set of physical rock properties in 3D. This transformation may be referred to as rock physics transformation. As such, the geomechanical model may be constructed by populating the 3D seismic image with elastic parameters that govern the response of sediments to stress, e.g., Poisson's ratio, Young modulus, angle of internal frication and the like.

At step 150, a three dimensional map of mechanical subsurface properties, such as stiffness tensor, Poisson's ratio, bulk modulus, density and the like, may be estimated using the initial seismic data, well log data, vertical seismic profile (VSP) data and the like.

At step 160, a numerical solver may be applied to the geomechanical model of the salt bodies and surrounding formation and the three dimensional map of mechanical subsurface properties to solve for stress, strain, pore pressure and deformation associated with the geomechanical model of salt bodies and surrounding formation and the three dimensional map of mechanical subsurface properties. The numerical solver may include finite element equations, finite difference equations and the like. In one implementation, the numerical solver may be configured to solve a static elastic, viscoelastic, or poro-elastic problem. In this manner, a three dimensional map of stress, strain, pore pressure and deformation may be derived using the numerical solver.

At step 170, the stress, strain, pore pressure and deformation may then be used to derive elastic parameters. In one implementation, the derivation may be accomplished using a third order elasticity theory, described in the above referenced commonly assigned U.S. Pat. No. 6,714,873. In this manner, a three dimensional map of elastic parameters may be derived using the stress, strain, pore pressure and deformation calculated using the numerical solver at step 160. An exemplary implementation of deriving elastic parameters as described in commonly assigned U.S. Pat. No. 6,714,873 is described below in the section entitled "Estimating Subsurface Principal Stresses from Seismic Reflection Data."

At step 180, the map of estimated principal stresses and orientations (generated at step 130) may be compared with the map of stress, strain, pore pressure and deformation (generated at step 160). Likewise, the map of elastic stiffness tensor associated with the azimuthal anisotropy parameters (generated at step 120) may be compared with the map of elastic parameters (derived at step 170). In one implementation, a determination is made as to whether both the map of estimated principal stresses and orientations (generated at step 130) and the map of stress, strain, pore pressure and deformation (generated at step 160) show deviatoric stresses at substantially the same locations. Deviatoric stresses may be defined as principal stresses that exceed their expected magnitude by about 5%. Generally, stresses may be resolved into a sum of two parts: a mean or hydrostatic part, involving only pure tension and compression, and a deviatoric part, involving only shear stress.

In another implementation, a determination may be made as to whether the magnitude, orientation and spatial distribution of the parameters in the map of elastic stiffness tensor (generated at step 120) and the map of elastic parameters (derived at step 170) are substantially similar. It should be understood that other types of comparisons may be made between the above referenced maps. Other comparisons may include deriving the difference between predicted parameters from a numerical solver and observed parameters from the wide azimuth seismic data. This difference may be referred to as residual.

If the answer in step 180 is negative, i.e., the deviatoric stresses are shown at different locations in the two maps being compared, then processing may return to steps 140-170, at which the stresses may be recalculated and the anisotropic elastic parameters may be rederived. In one implementation, at step 140, the geomechanical model of salt bodies and surrounding formation may be reconstructed using the anisotropic elastic parameters derived from the wide azimuth seismic data used to generate the CRP image at step 110.

In another implementation, at step 150, the three dimensional map of the mechanical subsurface properties may be re-estimated using the azimuthal anisotropy parameters derived at step 120.

In yet another implementation, the residual defined at step 180 may be minimized by perturbing model parameters using optimization techniques such as Newton's methods with conjugate gradients, as described in Gill, P. E., W. Murray, and M. H. Wright, Practical Optimization, London, Academic Press, 1981.

In yet another implementation, at step 170, the elastic parameters may be derived from stress, strain, pore pressure and deformation calibrated with well log data, such as those obtained using a sonic scanner.

In still another implementation, at step 170, the elastic parameters may be derived using a modified set of boundary conditions. Boundary conditions may be defined as the conditions imposed on a surface or edge, which are to be satisfied by a solution to a differential equation.

Referring back to step 180, if the answer is in the affirmative, then at step 190 a stability analysis may be performed and drilling parameters may be computed using the three dimensional map of elastic parameters derived at step 170. In one implementation, the stability analysis may be performed and the drilling parameters may be calculated using various techniques described in commonly assigned U.S. patent application Ser. No. 11/499,931, entitled METHOD AND SYSTEM FOR PRE-DRILL PORE PRESSURE PREDICTION filed Aug. 7, 2006, which is described below in more detail in the section entitled "Pre-Drill Pore Pressure Prediction."

Figure 2:
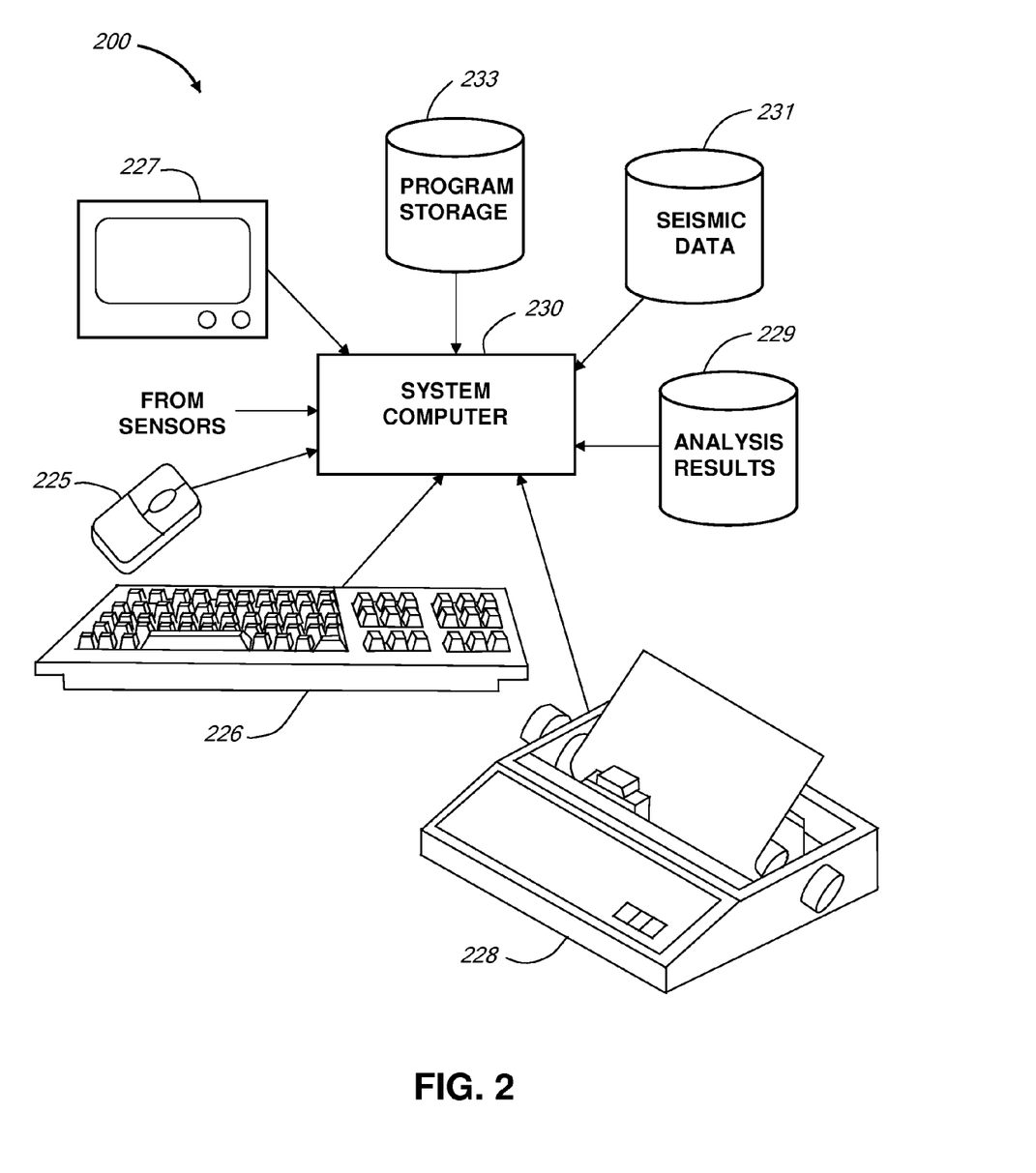
FIG. 2 illustrates an exemplary computer system.

FIG. 2 illustrates a computing system 200, into which implementations of various technologies described herein may be implemented. The computing system 200 may include one or more system computers 230, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 230 may be in communication with disk storage devices 229, 231, and 233, which may be external hard disk storage devices. It is contemplated that disk storage devices 229, 231, and 233 are conventional hard disk drives, and as such, will be implemented by way of a local area network or by remote access. Of course, while disk storage devices 229, 231, and 233 are illustrated as separate devices, a single disk storage device may be used to store any and all of the program instructions, measurement data, and results as desired.

In one implementation, seismic data from the receivers may be stored in disk storage device 231. The system computer 230 may retrieve the appropriate data from the disk storage device 231 to process seismic data according to program instructions that correspond to implementations of various technologies described herein. The program instructions may be written in a computer programming language, such as C++, Java and the like. The program instructions may be stored in a computer-readable medium, such as program disk storage device 233. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 230. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 230 may present output primarily onto graphics display 227, or alternatively via printer 228. The system computer 230 may store the results of the methods described above on disk storage 229, for later use and further analysis. The keyboard 226 and the pointing device (e.g., a mouse, trackball, or the like) 225 may be provided with the system computer 230 to enable interactive operation.

The system computer 230 may be located at a data center remote from the survey region. The system computer 230 may be in communication with the receivers (either directly or via a recording unit, not shown), to receive signals indicative of the reflected seismic energy. These signals, after conventional formatting and other initial processing, may be stored by the system computer 230 as digital data in the disk storage 231 for subsequent retrieval and processing in the manner described above. While FIG. 2 illustrates the disk storage 231 as directly connected to the system computer 230, it is also contemplated that the disk storage device 231 may be accessible through a local area network or by remote access. Furthermore, while disk storage devices 229, 231 are illustrated as separate devices for storing input seismic data and analysis results, the disk storage devices 229, 231 may be implemented within a single disk drive (either together with or separately from program disk storage device 233), or in any other conventional manner as will be fully understood by one of skill in the art having reference to this specification.

Acquiring Wide Azimuth and/or Full Azimuth Towed Streamer Seismic Surveys

As indicated above with regards to method 100, seismic data may be acquired using a wide azimuth or full azimuth towed streamer seismic acquisition system and acquisition methods described in commonly assigned U.S. patent application Ser. No. 11/335,365, entitled METHODS AND SYSTEMS FOR EFFICIENTLY ACQUIRING WIDE AZIMUTH AND/OR FULL AZIMUTH TOWED STREAMER SEISMIC SURVEYS, filed Jan. 19, 2006.

As described therein, one implementation of acquiring wide azimuth and/or full azimuth marine seismic data may include deploying a marine seismic spread comprising a plurality of source-only tow vessels each towing one or more marine seismic sources without streamers, and one or more source-streamer tow vessels each towing one or more marine seismic sources and one or more seismic streamers; and positioning the source-only tow vessels and the source-streamer tow vessels to acquire a wide- and/or full azimuth seismic survey without need for the spread to repeat a path once traversed.

Figure 3:
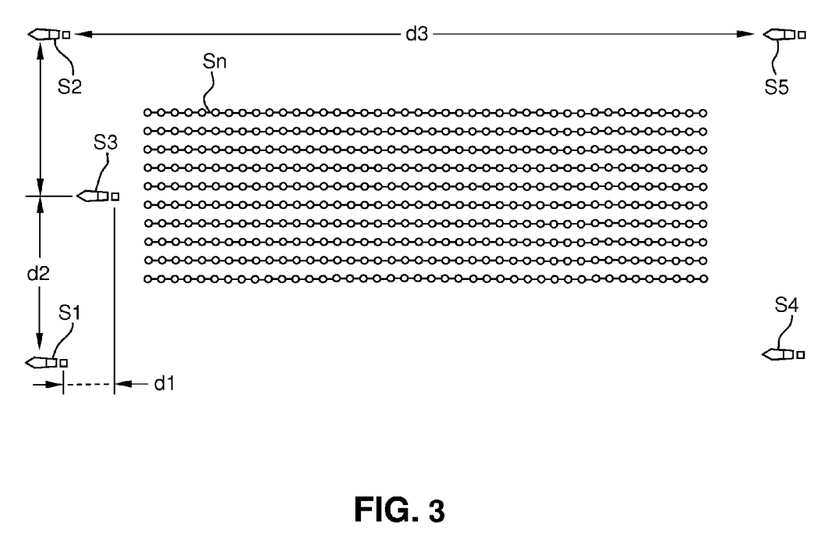
FIG. 3 is a plan or overhead schematic illustrating location of vessels and devices for acquiring seismic data.

One exemplary implementation described in U.S. patent application Ser. No. 11/335,365 is illustrated herein in FIG. 3. FIG. 3 illustrates an exemplary plan or overhead schematic computerized view of a system and method of the implementation.

The implementation represented schematically in FIG. 3 allows split-spread seismic data to be acquired simultaneously on two seismic sources lines. One benefit of acquiring two source lines simultaneously is a reduction in the acquisition time by half. Other configurations (e.g., containing a larger number of source lines) may produce commensurate (e.g., larger) time savings. Referring to FIG. 3, source-only vessels S1 and S2 travel to the left in the schematic, as does source-streamer vessel S3, and source-only vessels S4 and S5. Source-only vessels S1 and S2 tow sources to the front-port and front-starboard, respectively, while source-only vessels S4 and S5 tow sources to the back-port and back-starboard, respectively. Source-only vessels S1 and S4 travel approximately the same port line, while source-only vessels S2 and S4 travel approximately the same starboard line.

Source-streamer vessel S3 tows a source as well as 10 streamer cables, designated as Sn. The number of streamer cables may vary as desired depending on the data to be gathered. Anywhere from 1 to 20 streamers are typical. The streamers towed by source-streamer vessel S3 may be equal in length and at the same depth. Streamers Sn are each shown to be about 7000 meters in this implementation. The sources towed by source-only vessels S1 and S2 are separated in the y-coordinate, which is approximately perpendicular to the direction of travel of the spread, from the source towed by source-streamer vessel S3 by distances as indicated by arrow d2. The cross-line distances S1-S2 and S1-S3 may be the same or different. In this implementation, d2 is about 1500 meters port for S1, and about 1500 meters starboard for S2. Arrow d1 indicates a distance in the X-coordinate, or in-line direction of travel, between S1 and S3, as well as between S2 and S3, although these distances may be the same or different. In this example, d1 is about 500 meters. Finally, d3 represents the distance in the X-coordinate between sources towed by source-only tow vessels S2 and S5, as well as between the sources towed by source-only tow vessels S1 and S3, although the distances S1-S4 and S2-S5 may be the same or different. Distance d3 may vary as required by any particular survey; in this implementation, distance d3 is about 9000 meters.

In operation, as vessels S1, S2, S3, S4, and S5 travel forward (e.g., to the left in FIG. 3), the sources may be fired either sequentially or in some other manner, and receivers in streamers Sn may collect data. Since there are two source signaling lines (line S1-S4 and line S2-S5), as well as signals from S3, the sub-sea geologic formations between lines S1-S4 and S2-S5 may be collected without the need for the spread to traverse the same path twice.

While the foregoing is directed to one implementation of acquiring wide azimuth or full azimuth marine seismic data described in commonly assigned U.S. patent application Ser. No. 11/335,365, entitled METHODS AND SYSTEMS FOR EFFICIENTLY ACQUIRING WIDE AZIMUTH AND/OR FULL AZIMUTH TOWED STREAMER SEISMIC SURVEYS, other implementations are described therein and may be used by implementations of the present implementation in order to acquire wide azimuth and/or full azimuth seismic data.

Estimating Subsurface Principal Stresses from Seismic Reflection Data

As indicated above with regards to step 120 of method 100, azimuthal anisotropy parameters may be derived using implementations described in commonly assigned U.S. Pat. No. 6,714,873, entitled SYSTEM AND METHOD FOR ESTIMATING SUBSURFACE PRINCIPAL STRESSES FROM SEISMIC REFLECTION DATA.

As described in U.S. Pat. No. 6,714,873, techniques for the estimation of anisotropic coefficients of ORT (orthorhombic) media have been described previously and are based on analysis of azimuth and offset dependence of different seismic signatures. See e.g., Ruger, A., 1998, Variation of P-wave reflectivity with offset and azimuth in anisotropic media: Geophysics, 63, 935-947; Tsvankin, I., 1997, Anisotropic parameters and P-wave velocity for orthorhombic media: Geophysics, 62, 1292-1309; Grechka, V., and Tsvankin, I., 1999, 3-D moveout velocity analysis and parameter estimation in orthorhombic media: Geophysics, 64, 820-837; and Grechka, V., Theophanis, S., and Tsvankin, I., 1999, Joint inversion of P- and PS-waves in orthorhombic media: Theory and a physical-modeling study: Geophysics, 64, 146-161. The output of these techniques is interval anisotropic coefficients obtained by Dix differentiation or AVOA (amplitude versus offset and azimuth) analysis. See, Grechka and Tsvankin, 1999; Grechka et al., 1999; and Ruger, 1998.

In the ORT model, seismic signatures are controlled by 9 parameters: $V_{P0}$, $V_{S0}$, $\epsilon^{(1)}$, $\delta^{(1)}$, $\gamma^{(1)}$, $\epsilon^{(2)}$, $\delta^{(2)}$, $\gamma^{(2)}$, $\delta^{(3)}$. Here $V_{P0}$ and $V_{S0}$ are respectively P- and S-waves vertical velocities. All other parameters are called anisotropic coefficients (See, Tsvankin, 1997) and non-zero value of any of them indicates the presence of seismic anisotropy (in isotropic media all anisotropic coefficients are identically zero).

Furthermore, as indicated above with regards to step 130 of method 100 principal stresses and orientations may be estimated using techniques as described in the commonly assigned U.S. Pat. No. 6,714,873.

For example, an exemplary implementation of estimating two total principal stresses in the horizontal plane may be estimated from known vertical stress and anisotropic coefficients either numerically from exact expressions or from the following formula (1):

$$\mu = c_{44}^0 = \rho V_{S0}^2, \lambda = c_{33}^0 - 2c_{44}^0 = \rho V_{P0}^2 - 2\mu \tag{1}$$

where $V_{P0}$ and $V_{S0}$ are vertical velocities of P and S waves in ORT model.

For different scenarios using equation (1), one could:

1. Estimate magnitude of the difference between effective or total horizontal principal stresses according to the formula:

$$T_{22} - T_{11} = \sigma_{22} - \sigma_{11} = \frac{2c_{44}^0}{K_p}(\delta^{(1)} - \delta^{(2)}). \tag{2}$$

2. Estimate magnitudes of both remaining total principal stresses according to the formulae:

$$\sigma_{11} = \sigma_{33} + \frac{2c_{44}^0}{K_p}\delta^{(2)} \tag{3}$$

-continued $$\sigma_{22} = \sigma_{33} + \frac{2c_{44}^0}{K_p}\delta^{(1)} \quad (4)$$

Some redundancy in this case is provided by additional check:

$$T_{22} - T_{11} = \sigma_{22} - \sigma_{11} = \frac{2c_{44}^0}{K_p}\delta^{(3)} \quad (5)$$

3. The same as in previous scenario plus two more redundant checks in the form:

$$\sigma_{11} = \sigma_{33} + \frac{2c_{44}^0}{K_p}\gamma^{(2)}, \quad (6)$$

$$\sigma_{11} = \sigma_{33} + \frac{2c_{44}^0}{K_p}\gamma^{(2)}. \quad (7)$$

Note that in all three scenarios, one can validate whether elliptical anisotropy assumption is valid by checking the constraints $\eta^{(1)} = \eta^{(2)} = \eta^{(3)} = 0$. If these conditions are not satisfied it means that either assumption of initially isotropic rock is not valid or correction for intrinsic anisotropy was not good enough and requires another iteration.

Furthermore, as indicated above with regards to step 130 of method 100 an elastic stiffness tensor may be estimated using techniques as described in the commonly assigned U.S. Pat. No. 6,714,873.

As described therein, the elastic stiffness tensor may be estimated using the following technique. It is assumed that medium in the reference state is isotropic with two elastic constants ($c_{11}^0 = c_{33}^0$, $c_{44}^0 = c_{66}^0$, $c_{12}^0 = c_{13}^0 = c_{11}^0 - 2c_{66}^0$ or Lame parameters $\lambda = c_{33}^0 - 312c_{44}^0$ and $\mu = c_{44}^0$). Reference state is assumed to be either unstressed or some fixed hydrostatic stressed state. Magnitudes of three principal stresses and strains are measured with respect to the stress and strain in the reference state. To characterize the behavior of isotropic material under stress, one needs three third-order (non-linear) elastic constants taken here as $c_{111}$, $c_{112}$, and $c_{123}$ (Sinha and Kostek, 1995). In this case, triaxially stressed media is approximately equivalent to an orthorhombic anisotropic solid with the principal axes aligned with directions of principal stresses and stiffnesses given by equations (see, Sinha, B. K., 1982, Elastic waves in crystals under a bias: Ferroelectrics, 41, 61-73; Bakulin, A., Troyan, V., and Bakulin, V., 2000c, Acoustoelasticity of rocks: St. Petersburg Univ. Press; and Prioul et al., 2001):

$$c_{11} = c_{33}^0[1 + \Delta c_{11}], \; c_{22} = c_{33}^0[1 + \Delta c_{22}],$$

$$c_{33} = c_{33}^0[1 + \Delta c_{33}], \; c_{12} = c_{33}^0[1 + \Delta c_{12}],$$

$$c_{13} = c_{12}^0[1 + \Delta c_{13}], \; c_{23} = c_{12}^0[1 + \Delta c_{23}],$$

$$c_{44} = c_{44}^0[1 + \Delta c_{44}], \; c_{55} = c_{44}^0[1 + \Delta c_{55}],$$

$$c_{66} = c_{44}^0[1 + \Delta c_{66}]$$

$$\Delta c_{11} = \frac{1}{c_{33}^0}\{T_{11} + c_{111}E_{11} + c_{112}(E_{22} + C_{33}) + 2c_{33}^0 E_{11}\}$$

$$\Delta c_{22} = \frac{1}{c_{33}^0}\{T_{22} + c_{111}E_{22} + c_{112}(E_{11} + E_{33}) + 2c_{33}^0 E_{22}\}$$

$$\Delta c_{33} = \frac{1}{c_{33}^0}\{T_{33} + c_{111}E_{33} + c_{112}(E_{11} + E_{22}) + 2c_{33}^0 E_{33}\}$$

$$\Delta c_{12} = \frac{1}{c_{12}^0}\{c_{123}E_{33} + c_{112}(E_{11} + E_{22}) + c_{12}^0(E_{11} + E_{22})\}$$

$$\Delta c_{13} = \frac{1}{c_{12}^0}\{c_{123}E_{22} + c_{112}(E_{11} + E_{33}) + c_{12}^0(E_{11} + E_{33})\}$$

$$\Delta c_{23} = \frac{1}{c_{12}^0}\{c_{123}E_{11} + c_{112}(E_{22} + E_{33}) + c_{12}^0(E_{22} + E_{33})\}$$

$$\Delta c_{44} = \frac{1}{c_{44}^0}\left\{\frac{T_{22} + T_{33}}{2} + c_{144}E_{11} + (c_{155} + c_{44}^0)(E_{22} + E_{33})\right\}$$

$$\Delta c_{55} = \frac{1}{c_{44}^0}\left\{\frac{T_{11} + T_{33}}{2} + c_{144}E_{22} + (c_{155} + c_{44}^0)(E_{11} + E_{33})\right\}$$

$$\Delta c_{66} = \frac{1}{c_{44}^0}\left\{\frac{T_{11} + T_{22}}{2} + c_{144}E_{33} + (c_{155} + c_{44}^0)(E_{11} + E_{22})\right\}$$

where $c_{111}$, $c_{112}$, and $c_{123}$, are the three third-order (non-linear) elastic constants ($c_{144}^0 = (c_{112} - c_{123})/2$, $c_{155} = (c_{111} - c_{112})/4$).

Principal stresses and strains $T_{ij}$ and $E_{ij}$ are related by Hooke's law for the unstressed isotropic rock:

$$\begin{pmatrix} T_{11} \\ T_{22} \\ T_{33} \\ T_{23} \\ T_{13} \\ T_{12} \end{pmatrix} = \begin{pmatrix} c_{11}^0 & c_{12}^0 & c_{13}^0 & 0 & 0 & 0 \\ c_{12}^0 & c_{11}^0 & c_{13}^0 & 0 & 0 & 0 \\ c_{12}^0 & c_{13}^0 & c_{33}^0 & 0 & 0 & 0 \\ 0 & 0 & 0 & c_{44}^0 & 0 & 0 \\ 0 & 0 & 0 & 0 & c_{44}^0 & 0 \\ 0 & 0 & 0 & 0 & 0 & c_{66}^0 \end{pmatrix} \begin{pmatrix} E_{11} \\ E_{22} \\ E_{33} \\ E_{23} \\ E_{13} \\ E_{12} \end{pmatrix}$$

where $c_{11}^0 = c_{33}^0$, $c_{44}^0 = c_{66}^0$, $c_{12}^0 = c_{13}^0 = c_{11}^0 - 2c_{66}^0$.

While the foregoing describes some implementations of deriving azimuthal anisotropy parameters, estimating principal stresses and orientations, and estimating elastic stiffness tensors taught in commonly assigned U.S. Pat. No. 6,714,873, entitled SYSTEM AND METHOD FOR ESTIMATING SUBSURFACE PRINCIPAL STRESSES FROM SEISMIC REFLECTION DATA, other implementations may be described therein and may be used by implementations of various techniques described herein to derive azimuthal anisotropy parameters, estimate principal stresses and orientations, and estimate elastic stiffness tensors.

Pre-Drill Pore Pressure Prediction

As indicated above with regards to step 180 of method 100, the commonly assigned U.S. patent application Ser. No. 11/499,931 describes an exemplary implementation of performing stability analysis and calculating drilling parameters.

For example, as described therein, a drilling parameter such as pore pressure may be predicted in the following manner. Initially, a reference location is selected. The reference location may be a common reference location or it may be another location in an offset well or in a target borehole (i.e., a borehole whose current trajectory intersects with a pre-drill location). In one implementation, the reference location and the pre-drill location may include substantially similar physical properties (e.g., lithology, porosity, etc.). The similarity of physical properties may be verified using logs (e.g., resistivity logs, porosity logs, density logs, magnetic resonance logs, etc.).

The relationship between the effective stress, the total stress, and the pore pressure may be expressed in the following equation:

$$\sigma_{ij} S_{ij} - \alpha p \delta_{ij} \quad (8)$$

where i and j refer to components of a tensor, $\alpha_{ij}$ is the effective stress component, $S_{ij}$ is the total stress component, $\alpha$ is a poroelastic coefficient, $\delta_{ij}$ is 1 if i=j, and $\delta_{ij}$ is 0 if i≠j. $\alpha$ may be obtained using a variety of methods such as those described in Wang. H F., 2000, "Theory of Linear Poroelasticity—with Applications to Geomechanics and Hydrogeology" Princeton University Press. 287 pp. Those skilled in the art will appreciate that methods described in the aforementioned references are not intended to limit the scope of the implementation. Replacing the effective stress in equations $$v_P(\sigma_P, \sigma_h) = v_P^{(0)} + \alpha_P^V \Delta \sigma_V + \alpha_P^h \Delta \sigma_h \quad (9) \text{ or}$$

$$v_S(\sigma_V, \sigma_h) = v_S^{(0)} + \alpha_S^V \Delta \sigma_V + \alpha_S^h \Delta \sigma_h \quad (10)$$

using $$v_{S1}(\sigma_V, \sigma_h, \sigma_H) = v_{S1}^{(0)} + \alpha_{S1}^V \Delta \sigma_V + \alpha_{S1}^h \Delta \sigma_h + \alpha_{S1}^H \Delta \sigma_H \quad (11) \text{ or}$$

which yields $$v_P(S_V, S_h, p) = v_P^{(0)} + \alpha_P^V (\Delta S_V + \alpha \Delta p) + \alpha_P^h (\Delta S_h + \alpha \Delta p) \quad (12)$$

$$v_S(S_V, S_h, p) = v_S^{(0)} + \alpha_S^V (\Delta S_V + \alpha \Delta p) + \alpha_S^h (\Delta S_h + \alpha \Delta p) \quad (13)$$

Various variables in equations (12)-(13) are defined as follows: $v_P(S_V, S_h, p)$ is the P-wave velocity associated with the pre-drill location, $v_S(S_V, S_h, p)$ is the S-wave velocity associated with the pre-drill location; $v_P^{(0)}$ is a reference P-wave velocity associated with the reference location; $v_S^{(0)}$ is a reference S-wave velocity associated with the reference location; $\alpha_P^V$ is the vertical compressional stress sensitivity coefficient; $\alpha_P^h$ is the horizontal compressional stress sensitivity coefficient; $\alpha_S^V$ is the vertical shear stress sensitivity; $\alpha_S^h$ is the horizontal shear stress sensitivity coefficient; $S_V$ is the total vertical stress; $\Delta S_h$ is the total horizontal stress; p is the pore pressure; the terms preceded by $\Delta$ represent the difference between values at the pre-drill location and the reference location; and $\alpha$ is the poroelastic coefficient.

$\Delta p$ may be determined using equation (12) and/or equation (13). Once determined, $\Delta p$ may then be added to the pore pressure at the reference location to obtain the predicted pore pressure.

While the foregoing describes one implementation of estimating drilling parameters (i.e., estimating or predicting pore pressure) described in the commonly assigned U.S. patent application Ser. No. 11/499,931, other implementations of performing stability analysis and calculating drilling parameters may be described therein and may be used by implementations of various techniques described herein.

Furthermore, while the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   deriving a first set of anisotropic parameters using seismic data;
   estimating a three dimensional map of stresses using the first set of anisotropic parameters;
   constructing a geomechanical earth model using the seismic data;
   generating a three dimensional map of strain based on the geomechanical earth model; and
   modifying the geomechanical earth model based on the first set of anisotropic parameters if the three dimensional map of stresses and the three dimensional map of strain are different.

2. The method of claim 1, wherein the first set of anisotropic parameters is derived using wide azimuth seismic data.

3. The method of claim 2, wherein the wide azimuth seismic data is acquired using a wide azimuth towed streamer acquisition system.

4. The method of claim 2, further comprising using the wide azimuth seismic data to map stresses caused by salt bodies.

5. The method of claim 1, further comprising:
   deriving a second set of anisotropic parameters based on the three dimensional map of strain; and
   comparing the first set of anisotropic parameters with the second set of anisotropic parameters.

6. The method of claim 5, further comprising predicting the drilling parameters using the geomechanical earth model if the first set of anisotropic parameters and the second set of anisotropic parameters are substantially similar.

7. The method of claim 5, further comprising modifying the geomechanical earth model using the first set of anisotropic parameters if the first set of anisotropic parameters and the second set of anisotropic parameters are different.

8. The method of claim 1, further comprising predicting drilling parameters using the geomechanical earth model if the three dimensional map of stresses and the three dimensional map of strain are substantially similar.

9. The method of claim 1, wherein deriving the first set of anisotropic parameters using seismic data comprises:
   processing the seismic data to obtain a common reflection point image; and
   deriving azimuthal anisotropy parameters from the common reflection point image.

10. The method of claim 9, wherein the azimuthal anisotropy parameters are derived from the common reflection point image using tomography on azimuths associated with the common reflection point image.

11. The method of claim 9, wherein the azimuthal anisotropy parameters are derived from the common reflection point image using a moveout analysis on azimuths associated with the common reflection point image.

12. The method of claim 9, wherein the azimuthal anisotropy parameters are derived from the common reflection point image using amplitude versus angle and azimuth inversion.

13. The method of claim 9, wherein estimating the three dimensional map of stresses comprises generating a map of principal stresses and orientations using the derived azimuthal anisotropy parameters.

14. The method of claim 13, wherein generating the map of principal stresses and orientations using the derived azimuthal anisotropy parameters is accomplished using a third order elasticity theory.

15. The method of claim 1, wherein generating the three dimensional map of strain comprises:

estimating a three dimensional map of mechanical subsurface properties using the seismic data;

applying a numerical solver to the geomechanical earth model and to the three dimensional map of mechanical subsurface properties to solve for stresses, strain, pore pressure or deformation or combinations thereof associated with the geomechanical earth model and the three dimensional map of mechanical subsurface properties; and deriving the three dimensional map of strain from the stresses, strain, pore pressure or deformation or combinations thereof.

16. The method of claim 15, wherein the numerical solver comprises a finite element equation or a finite difference equation or combinations thereof.

17. The method of claim 15, wherein the numerical solver is configured to solve a static elastic problem, a visco-elastic problem or a poro-elastic problem or combinations thereof.

18. A computer readable medium containing a program which, when executed, performs operations comprising:

deriving anisotropic parameters using seismic data:

estimating a three dimensional map of stresses using the anisotropic parameters;

constructing a geomechanical earth model using the seismic data;

generating a three dimensional map of strain based on the geomechanical earth model; and predicting drilling parameters using the geomechanical earth model if the three dimensional map of stresses and the three dimensional map of strain are substantially similar.

19. The computer readable medium of claim 18, wherein the operations further comprise using the seismic data to map stresses caused by salt bodies.

20. A computing system comprising:

at least one system computer; and one or more receivers coupled to the at least one system computer and configured to receive seismic data; and wherein the system computer is configured to:

derive a first set of anisotropic parameters using the seismic data;

estimate a three dimensional map of stresses using the first set of anisotropic parameters;

construct a geomechanical earth model using the seismic data;

generate a three dimensional map of strain based on the geomechanical earth model; and modify the geomechanical earth model based on the first set of anisotropic parameters if the three dimensional map of stresses and the three dimensional map of strain are different.

21. The computing system of claim 20, wherein the three dimensional map of strain is generated by:

estimating a three dimensional map of mechanical subsurface properties using the seismic data;

applying a numerical solver to the geomechanical earth model and to the three dimensional map of mechanical subsurface properties to solve for stresses, strain, pore pressure or deformation or combinations thereof associated with the geomechanical earth model and the three dimensional map of mechanical subsurface properties; and deriving the three dimensional map of strain from the stresses, strain, pore pressure or deformation or combinations thereof.

22. The computing system of claim 20, wherein the first set of anisotropic parameters is derived using wide azimuth seismic data.

23. The computing system of claim 21, wherein the system computer is further configured to derive a second set of anisotropic parameters based on the stresses, strain, pore pressure or deformation or combinations thereof.

24. The computing system of claim 23, wherein the system computer is further configured to predict drilling parameters using the geomechanical earth model if the first set of anisotropic parameters and the second set of anisotropic parameters are substantially similar.

25. The computing system of claim 23, wherein the system computer is further configured to modify the geomechanical earth model if the first set of anisotropic parameters and the second set of anisotropic parameters are different.

26. The method of claim 1, further comprising predicting drilling parameters using the modified geomechanical earth model.

27. The method of claim 1, wherein the geomechanical earth model is a geomechanical earth model of salt bodies and a surrounding formation.

28. The method of claim 1, further comprising estimating a three dimensional map of mechanical subsurface properties using the seismic data, wherein the three dimensional map of strain is based on the geomechanical earth model and the three dimensional map of mechanical subsurface properties.

29. The method of claim 1, wherein the three dimensional map of stresses comprises a three dimensional map of principal stresses and orientations.

30. The method of claim 1, wherein the three dimensional map of strain comprises a three dimensional map of stresses and strain.

* * * * *